US012424627B2

(12) United States Patent
Capiglia

(10) Patent No.: US 12,424,627 B2
(45) Date of Patent: Sep. 23, 2025

(54) ANODE MATERIAL INCLUDING CARBON COATED ELLIPTICAL SECONDARY GRAPHITE PARTICLES COMPOSED OF AGGREGATED GROUND PRIMARY PARTICLES, AND METHOD FOR PRODUCING THE SAME

(71) Applicant: Talga Technologies Limited, Cambridge (GB)

(72) Inventor: Claudio Capiglia, Osaka (JP)

(73) Assignee: TALGA TECHNOLOGIES LIMITED, Cambridge (GB)

( * ) Notice: Subject to any disclaimer, the term of this patent is extended or adjusted under 35 U.S.C. 154(b) by 569 days.

(21) Appl. No.: 17/642,472

(22) PCT Filed: Sep. 24, 2020

(86) PCT No.: PCT/IB2020/058910
§ 371 (c)(1),
(2) Date: Mar. 11, 2022

(87) PCT Pub. No.: WO2021/059171
PCT Pub. Date: Apr. 1, 2021

(65) Prior Publication Data
US 2023/0246191 A1    Aug. 3, 2023

(30) Foreign Application Priority Data

Sep. 24, 2019  (AU) ................................ 2019903561
Jul. 1, 2020    (AU) ................................ 2020902246

(51) Int. Cl.
*H01M 4/587* (2010.01)
*C01B 32/21* (2017.01)
(Continued)

(52) U.S. Cl.
CPC ............. *H01M 4/587* (2013.01); *C01B 32/21* (2017.08); *H01M 4/133* (2013.01);
(Continued)

(58) Field of Classification Search
CPC ........ H01M 4/587; H01M 4/133; C01B 32/21
(Continued)

(56) References Cited

U.S. PATENT DOCUMENTS 6,482,547 B1 * 11/2002  Yoon ..................... H01M 4/587
                                                      429/231.8
2011/0104553 A1    5/2011  Pol
(Continued)

FOREIGN PATENT DOCUMENTS

GB        2498803 A       7/2013
KR   101004443 B1        12/2010
(Continued)

OTHER PUBLICATIONS

International Patent Application No. PCT/IB2020/058910, International Search Report mailed Dec. 11, 2020, 6 pages.
(Continued)

*Primary Examiner* — Basia A Ridley
(74) *Attorney, Agent, or Firm* — Leber IP Law; Celia H. Leber

(57) ABSTRACT

An anode material comprising secondary graphite particles that predominantly have a form that approximates an oblate spheroid and have a $D_{50}$ of less than about 5 microns.

22 Claims, 14 Drawing Sheets

(51) Int. Cl.
*H01M 4/02* (2006.01)
*H01M 4/133* (2010.01)

(52) U.S. Cl.
CPC ...... *C01P 2002/72* (2013.01); *C01P 2004/03* (2013.01); *C01P 2004/32* (2013.01); *C01P 2004/50* (2013.01); *C01P 2004/61* (2013.01); *C01P 2004/84* (2013.01); *C01P 2006/11* (2013.01); *C01P 2006/12* (2013.01); *C01P 2006/40* (2013.01); *H01M 2004/021* (2013.01); *H01M 2004/027* (2013.01)

(58) Field of Classification Search
USPC ...................................... 429/231.8
See application file for complete search history.

(56) References Cited

U.S. PATENT DOCUMENTS

2014/0099551 A1* 4/2014 Han ............... H01M 10/052
429/223
2019/0198865 A1* 6/2019 Kim ............... H01M 4/485

FOREIGN PATENT DOCUMENTS

WO WO-2016067539 A1 * 5/2016 ............. C01B 32/20
WO 2018068035 A1 4/2018

OTHER PUBLICATIONS

International Patent Application No. PCT/IB2020/058910, Written Opinion mailed Dec. 11, 2020, 11 pages.

* cited by examiner

ANODE MATERIAL INCLUDING CARBON COATED ELLIPTICAL SECONDARY GRAPHITE PARTICLES COMPOSED OF AGGREGATED GROUND PRIMARY PARTICLES, AND METHOD FOR PRODUCING THE SAME

RELATED APPLICATIONS

This application is a national phase entry of International Patent Application No. PCT/IB2020/058910, filed Sep. 24, 2020, which claims priority from Australian Patent Application No. 2019903561, filed Sep. 24, 2019 and Australian Patent Application No. 2020902246, filed Jul. 1, 2020, the entire disclosures of which are incorporated herein by reference.

FIELD OF THE INVENTION

The present invention relates to an anode material. More particularly, the anode material of the present invention is intended for use as an anode material in lithium-ion batteries.

In one highly preferred form, the anode material of the present invention comprises secondary graphite particles predominantly having a form that approximates an oblate spheroid and have a $D_{50}$ of less than about 5 microns.

The present invention further relates to a method for producing an anode material.

BACKGROUND ART

Lithium-ion battery anode materials utilising graphite materials are known to limit battery performance at low temperatures. This is largely believed to be due to issues of lithium plating and Solid Electrolyte Interphase (SEI) degradation. That is, cold temperatures can cause deposits of lithium metal to form in the battery, causing internal short circuits that may lead to fires in cells.

It is understood that lithium ion batteries typically suffer lower capacity retention and cycling efficiency in freezing conditions, causing shorter runtime of devices, including laptop computers and mobile phones, or shorter driving range in electric vehicles (Temperature effect and thermal impact in lithium-ion batteries: A Review, Progress in Natural Science: Materials International, Shuai Ma et al., December 2018).

Li-ion batteries are widely used at room temperature because of their high specific energy and energy density, long cycle life, low self-discharge, and long shelf life (*The Limits of Low-Temperature Performance of Li-Ion Cells*, Huang et al., Journal of The Electrochemical Society, 147 (8) 2000). When charging a Li-ion battery, the lithium ions inside the battery are soaked up (as in a sponge) by the porous negative electrode (anode), made of graphite.

Under temperatures approaching freezing (0° C.) however, the lithium ions aren't efficiently captured by the anode. Instead, many lithium ions are reduced to lithium metal and coat the surface of the anode, a process called lithium plating, resulting in less lithium available to carry the flow of electricity. Consequently, the battery's capacity and cycle efficiency drops and this translates to poorer performance (*Final Technical Report: Internal Short Circuits in Lithium-Ion Cells for PHEVs*" Sriramulu & Stringfellow, 2014).

In cooler countries of the northern hemisphere, it has been measured that the driving range of electric vehicles can be reduced by 41% in real world sub-zero conditions (*Electric Vehicle Range Testing: AAA proprietary research into the effect of ambient temperature and HVAC use on driving range and MPGe*, American Automobile Association, February 2019).

The most significant negative effect of low temperature on Li-ion batteries is the generation of lithium metal growths, called dendrites, that can perforate the separator and cause a short circuit or fire in the lithium-ion cells. A well-publicised example of this was in the 2013 grounding of Boeing 787 Dreamliner aircraft following a spate of electrical system failures, including fires. Investigation found that cold winter overnight temperatures fostered lithium plating within the battery cells and caused the short circuits (*Aircraft Serious Incident Investigation Report*, All Nippon Airways Ltd, JA804A., September 2014).

The anode material composite and method of the present invention has as one object thereof to overcome substantially one or more of the above-mentioned problems associated with the prior art, or to at least provide a useful alternative thereto.

The preceding discussion of the background art is intended to facilitate an understanding of the present invention only. This discussion is not an acknowledgement or admission that any of the material referred to is or was part of the common general knowledge as at the priority date of the application.

Throughout the specification and claims, unless the context requires otherwise, the word "comprise" or variations such as "comprises" or "comprising", will be understood to imply the inclusion of a stated integer or group of integers but not the exclusion of any other integer or group of integers.

Throughout the specification and claims, unless the context requires otherwise, references to "milling" are to be understood to include reference to "grinding", and references to "grinding" are to be understood to include reference to "milling".

Throughout the specification and claims, unless the context requires otherwise, the term "oblate spheroid" or variations thereof, refer to a surface of revolution obtained by rotating an ellipse about its minor axis. Simply, an oblate spheroid is understood to be a flattened sphere, in which it is wider than it is high.

DISCLOSURE OF THE INVENTION

In accordance with the present invention there is provided an anode material comprising secondary graphite particles that predominantly have a form that approximates an oblate spheroid, that being a surface of revolution obtained by rotating an ellipse about its minor axis, and have a $D_{50}$ of less than about 5 microns, wherein the secondary graphite particles comprise an aggregate of ground primary graphite particles, and the ground primary graphite particles are spheronised and coated with a carbon based material being one or more of pitch, polyethylene oxide and polyvinyl oxide, then pyrolysed at a temperature between 880° C. to 1100° C. for a time in the range of 12 to 40 hours, thereby producing the secondary particle that approximates an oblate spheroid, wherein the amount of carbon based material in the secondary graphite particles is in the range of 2 to 10 wt % relative to graphite.

Preferably, the secondary graphite particles have a $D_{50}$ of between about 3 to 5 microns. Still preferably, the secondary graphite particles have a $D_{50}$ of about 3.5 microns.

Preferably, the secondary graphite particles have a surface area (BET) of:
(i) about 2 to 9 m$^2$/g; or
(ii) about 2 to 6 m$^2$/g.

The compression density of the secondary graphite particles at 75 kf/cm$^2$ is preferably in the range of about 1.0 to 1.5 g/cc (bulk density).

The conductivity of the secondary graphite particles is preferably in the range of about 25 to 37 S/cm, for example about 31 S/cm.

Preferably, the anode material further comprises a thickening agent.

In one embodiment, the thickening agent is carboxymethyl cellulose (CMC).

Preferably, the anode material still further comprises an aqueous binder.

In one embodiment, the aqueous binder is styrene-butadiene rubber (SBR).

Preferably, the anode material has a capacity retention of greater than 91% at 2C rate discharge.

In one form of the present invention the anode material comprises about 97.5% wt/wt secondary graphite particles, about 1.5% wt/wt SBR and about 1% wt/wt CMC.

The ground primary graphite particles preferably have a D$_{50}$ of:
(i) less than about 15 microns;
(ii) less than about 10 microns; or
(iii) in the range of about 4 to 6 microns.

Preferably, the ground primary graphite particles have a surface area (BET) of about 2 to 9 m$^2$/g, for example 7 to 9 m$^2$/g.

Preferably, the ground primary graphite particles have XRD characteristics of one or more of a d002 of >3.35 Å, an Lc of >1000 Å and an La of >1000 Å. In a preferred form, the ground primary graphite particles have XRD characteristics of each of a d002 of >3.35 Å, an Lc of >1000 Å and an La of >1000 Å, and a purity of >99.9%.

In accordance with the present invention there is still further provided an anode comprising an anode material as described hereinabove in combination with a current collector.

Preferably, the anode material is arranged on the current collector in an irregular arrangement, whereby lithium ion passage therethrough is facilitated.

Still preferably, the anode material is arranged on the current collector at a thickness of about 60 to 75 microns, for example 71 microns.

In accordance with the present invention there is yet still further provided a method for the production of an anode material, the method comprising the grinding of a graphite material to produce ground primary graphite particles, wherein those ground primary graphite particles are spheronised and coated with a carbon based material being one or more of pitch, polyethylene oxide and polyvinyl oxide, then pyrolysed at a temperature between 800° C. to 1100° C. for a time in the range of 12 to 40 hours, to produce secondary graphite particles having an amount of carbon based material in the range of 2 to 10 wt % relative to graphite and predominantly having a form that approximates an oblate spheroid, that being a surface of revolution obtained by rotating an ellipse about its minor axis, and that have a D$_{50}$ of less than about 5 microns.

Preferably, the ground graphite particles are processed in an agglomeration and/or surface modification step producing the secondary graphite particles predominantly having a form that approximates an oblate spheroid, that being a surface of revolution obtained by rotating an ellipse about its minor axis.

Still preferably, the agglomeration and/or surface modification step comprises a spray drying process. The spray drying process may preferably be achieved utilising a fluidised bed.

The ground primary graphite particles preferably have a D$_{50}$ of:
(i) less than about 15 microns;
(ii) less than about 10 microns; or
(iii) in the range of about 4 to 6 microns.

Preferably, the ground primary graphite particles have a surface area of about 2 to 9 m$^2$/g, for example 7 to 9 m$^2$/g.

Preferably, the secondary graphite particles have a D$_{50}$ of between about 3 to 5 microns. Still preferably, the secondary graphite particles have a D$_{50}$ of about 3.5 microns.

Preferably, the secondary graphite particles have a surface area of:
(i) about 2 to 9 m$^2$/g; or
(ii) about 2 to 6 m$^2$/g.

Preferably, the ground primary graphite particles have XRD characteristics of one or more of a d002 of >3.35 Å, an Lc of >1000 Å and an La of >1000 Å. In a preferred form, the ground primary graphite particles have XRD characteristics of each of a d002 of >3.35 Å, an Lc of >1000 Å and an La of >1000 Å, and a purity of >99.9%.

BRIEF DESCRIPTION OF THE DRAWINGS

The present invention will now be described, by way of example only, with reference to several embodiments thereof and the accompanying drawings, in which:—

BEST MODE(S) FOR CARRYING OUT THE INVENTION

Figure 1A:
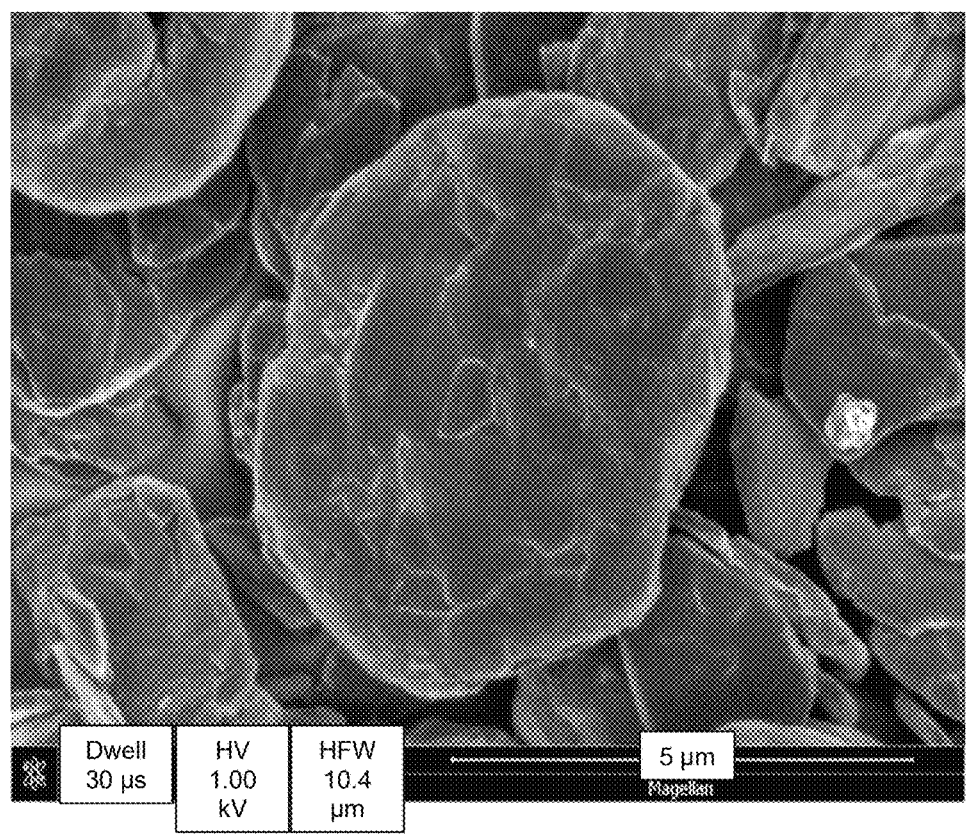
FIGS. 1A and 1B are scanning electron microscope (SEM) images of an anode material of the present invention comprises secondary graphite particles predominantly having a form that approximates an oblate spheroid.

The present invention provides an anode material comprising secondary graphite particles that predominantly have a form that approximates an oblate spheroid. The secondary graphite particles have a $D_{50}$ of less than about 5 microns, for example between about 3 to 5 microns, or about 3.5 microns.

The secondary graphite particles have a surface area of about 2 to 9 $m^2/g$, for example 2 to 6 $m^2/g$.

It is understood by the Applicant that the combination of graphite particle size and surface area as describe herein is particularly advantageous.

The compression density of the secondary graphite particles at 75 $kf/cm^2$ is in the range of about 1.0 to 1.5 g/cc (bulk density) and the conductivity of the secondary graphite particles is in the range of about 25 to 37 S/cm, for example about 31 S/cm.

The anode material further comprises a thickening agent. In one embodiment, the thickening agent is carboxymethyl cellulose (CMC).

The anode material still further comprises an aqueous binder. In one embodiment, the aqueous binder is styrene-butadiene rubber (SBR).

The anode material has, in one form, a capacity retention of greater than 91% at 2C rate discharge, assuming 100% capacity retention at 0.2C.

In one form of the present invention the anode material comprises about 97.5% wt/wt secondary graphite particles, about 1.5% wt/wt SBR and about 1% wt/wt CMC.

The present invention further provides an anode comprising an anode material as described hereinabove in combination with a current collector, for example a copper current collector.

The anode material is arranged on the current collector in an irregular arrangement, whereby lithium ion absorption is facilitated thereby.

In one embodiment, the anode material is arranged on the current collector at a thickness of about 60 to 75 microns, for example 71 microns.

The secondary graphite particles comprise ground primary graphite particles, the ground primary graphite particles further comprise a carbon based material. The carbon based material is, for example, one or more of pitch, polyethylene oxide and polyvinyl oxide. The amount of carbon based material in the secondary graphite particles is in the range of 2 to 10 wt % relative to graphite.

The ground primary graphite particles have a $D_{50}$ of:
(i) less than about 15 microns;
(ii) less than about 10 microns; or
(iii) in the range of about 4 to 6 microns.

The ground primary graphite particles have a surface area of about 2 to 9 $m^2/g$, for example 7 to 9 $m^2/g$.

The ground primary graphite particles have XRD characteristics of one or more of a d002 of >3.35 Å, an Lc of >1000 Å and an La of >1000 Å. For example, the ground primary graphite particles have XRD characteristics of each of a d002 of >3.35 Å, an Lc of >1000 Å and an La of >1000 Å, and a purity >99.9%.

The present invention still further provides a method for the production of an anode material, the method comprising the grinding of a graphite material to produce ground primary graphite particles, wherein those ground primary graphite particles are processed in a manner so as to produce secondary graphite particles predominantly having a form that approximates an oblate spheroid and that have a $D_{50}$ of less than about 5 microns.

In one form of the present invention the ground primary graphite particles are spheronised and coated with a carbon based material, after which they are pyrolysed, thereby producing the secondary particle that approximates an oblate spheroid.

The carbon based material is one or more of pitch, polyethylene oxide and polyvinyl alcohol. The amount of carbon based material used in coating the ground primary graphite particles is in the range of about 2 to 10 wt % relative to graphite.

The temperature of pyrolysis is between about 880° C. to 1100° C. The time for pyrolysis is in the range of about 12 to 40 hours.

The ground primary graphite particles have a $D_{50}$ of less than about 15 microns, for example less than about 10 microns, or in the range of about 4 to 6 microns.

The ground primary graphite particles have a surface area of about 2 to 9 $m^2/g$, for example 7 to 9 $m^2/g$.

The ground primary graphite particles have a $D_{50}$ of:
(i) less than about 15 microns;
(ii) less than about 10 microns; or
(iii) in the range of about 4 to 6 microns.

The secondary graphite particles have a $D_{50}$ of between about 3 to 5 microns, for example about 3.5 microns.

The ground primary graphite particles have XRD characteristics of one or more of a d002 of >3.35 Å, an Lc of >1000 Å and an La of >1000 Å. For example, the ground primary graphite particles have XRD characteristics of each of a d002 of >3.35 Å, an Lc of >1000 Å and an La of >1000 Å, and a purity >99.9%.

In a further form of the present invention the ground primary graphite particles are processed by way of an agglomeration and/or surface modification step so as to produce the secondary graphite particles predominantly having a form that approximates an oblate spheroid. The agglomeration and/or surface modification step may comprise a spray drying process. In one embodiment the spray drying process is achieved utilising a fluidised bed.

In a typical arrangement of graphite flake relative to a collector in an anode of the prior art, the anisotropic graphite flake or particle orientation relative to the collector contributes to consequent high resistance to diffusion of lithium ions therethrough. The anisotropic graphite particle orientation simply doesn't provide any physical opportunity for lithium ion diffusion. Consequently, the prior art has sought to orient graphite in random directions, creating spheronised graphite in an effort to overcome the anisotropic limitations apparent. This is why most current anode materials are nearly spherical in shape. The near spherical shape of prior art graphite anode material is also intended to provide a packing density needed on the collector so as to increase the volumetric capacity to store lithium.

Without limitation to the scope of the present invention, the secondary graphite particles of the present invention are envisaged to ideally be orientated in a largely irregular manner relative to a collector and thereby provide consequently lower resistance to diffusion of lithium ions therethrough. The oblate spheroid nature of the secondary particles of the present invention are such that they do not orient in the same manner as the graphite flake of the prior art. Rather, the secondary particles of the present invention clump in an irregular manner, creating clumps of secondary particles that provide a level of porosity, and a relatively greater packing density, in the anode material and the anode of the present invention. It is understood by the Applicants that swelling and lithium ion resistance in the anode of the present invention are reduced relative to that of the prior art.

Figure 1B:
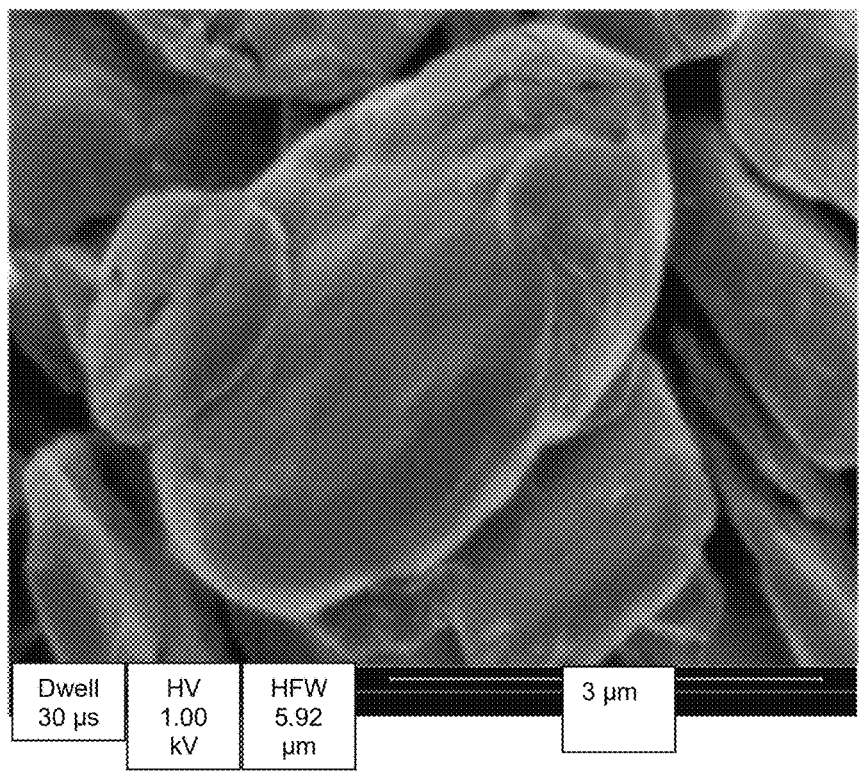

In FIGS. 1A and 1B there are shown a number of generally oblate spheroid secondary graphite particles of the present invention, showing their $D_{50}$ in the range of about 3 to 5 microns.

The process of the present invention may be better understood with reference to the following non-limiting examples.

EXAMPLE

As noted above, the present invention still further provides a method for the production of an anode material, the method comprising the grinding of a graphite material to produce ground primary graphite particles, wherein those ground primary graphite particles are processed in a manner so as to produce secondary graphite particles predominantly having a form that approximates an oblate spheroid.

Table A below provides an example of an appropriate ground primary graphite particle for use in/as used in the method of the present invention, whilst Table B provides the elemental analysis thereof.

TABLE A

| Property | Value | Method |
| --- | --- | --- |
| Carbon Content | >99.9% | LECO (C %, S %). Loss of Ignition (LOI) |
| Surface Area | 2-9 m$^2$/g | Bernauer-Emmett-Teller (BET) |
| Particle size | 3~15 μm | Particle size analyzer |
| $D_{10}$ | 1~3 μm | |
| $D_{50}$ | 4~6 μm | |
| $D_{90}$ | 7-10 μm | |
| Bulk Density | 0.2-1 g/cc | Bulk density apparatus |
| d1002 | >3.35 Å | XRD |
| Lc | >1000 Å | |
| La | >1000 Å | |

TABLE B

| C | Al | Ca | Cu | Fe | K | Mg | Mn | Si | S | ELEMENTS |
| --- | --- | --- | --- | --- | --- | --- | --- | --- | --- | --- |
| >99.9% | 3.3 | 7.4 | 7.3 | 26.7 | 5.7 | 2.9 | 0.2 | <0.1 | 37 | ppm |

The ground primary graphite particles are spheronised and coated with a carbon based material, after which they are pyrolysed, thereby producing the secondary particle that approximates an oblate spheroid. The carbon based material is one or more of pitch, polyethylene oxide and polyvinyl alcohol. The amount of carbon based material used in coating the ground primary graphite particles is in the range of 2 to 10 wt % relative to graphite. The temperature of pyrolysis is between about 880° C. to 1100° C. The time for pyrolysis is in the range of about 12 to 40 hours, including both heating and cooling periods.

Figure 2:
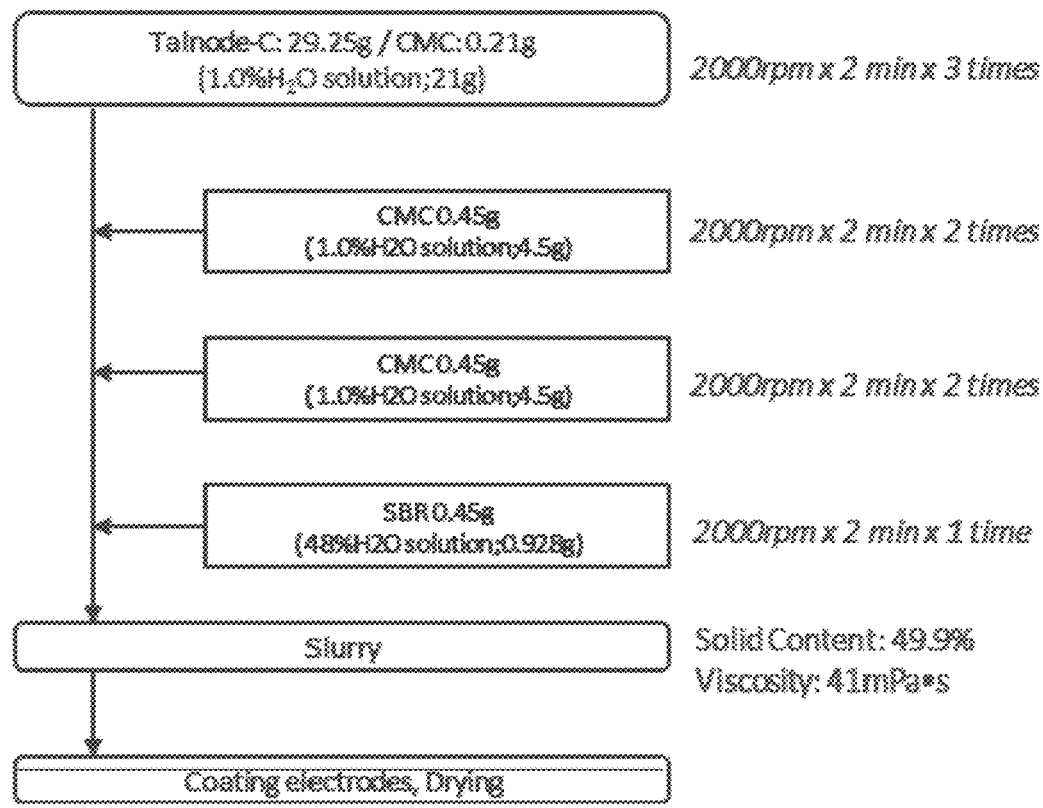
FIG. 2 is a schematic representation of the steps employed in the production of an electrode in accordance with an embodiment of the present invention, showing the secondary graphite particle (referenced as 'Talnode-C') being processed through a series of process steps to provide a slurry and in turn producing the electrode.

In FIG. 2 there is shown a representation of the method for slurrying an anode material in accordance with the present invention for application, in known manner, to a collector, to produce an anode in accordance with one embodiment of the present invention. As noted, the secondary graphite particles of the present invention, here designated Talnode-C, is mixed at an amount of 29.25 g, with 0.21 g of CMC, providing a 1.0% H$_2$O solution; 21 g. This is mixed at 2000 rpm for 2 minutes, three times. Two subsequent additions of 0.45 g of CMC (1.0% H$_2$O solution; 4.5 g) are made and mixed at 2000 rpm for two minutes, two times, as shown. Further, a 0.45 g addition of SBR is provided (48% H$_2$O solution; 0.928 g), and mixed at 2000 rpm for two minutes, a single time. This process provides a slurry of anode material in accordance with the present invention at a solids content of 49.9% and a viscosity of 41 mPa·s. Subsequent application of the slurry so produced to a collector, and drying, is achieved in known manner. This process provides an anode composition of 97.5% wt/wt secondary graphite particles, about 1.5% wt/wt SBR and about 1% wt/wt CMC.

Figure 3:
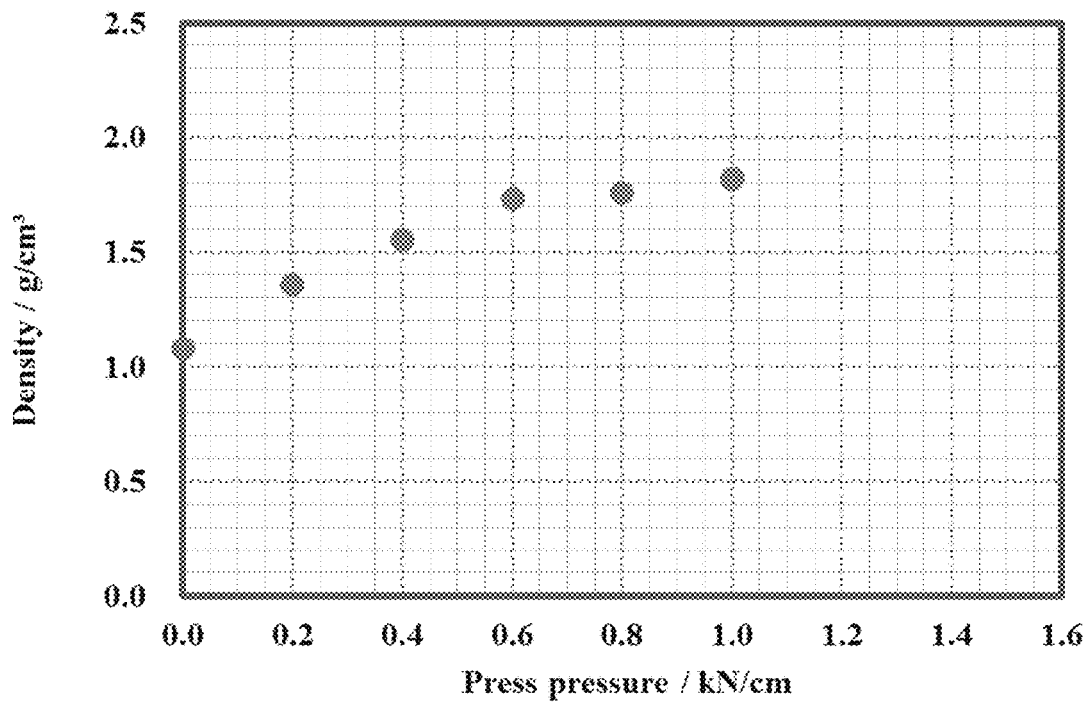
FIG. 3 is a graph of electrode density against mechanical strength, for an electrode prepared in accordance with the present invention, utilising the secondary graphite particles thereof.

Table 1 below describes the characteristics of the anode produced in accordance with the present invention and FIG. 3 shows a graph of electrode density against mechanical strength. The density and mechanical strength of the anode of the present invention are good relative to those of equivalent prior art anodes, and the reversible capacity, of 350-365 mAh/g, depending upon the cell configuration, is understood by the Applicant to be 'industry-standard'.

TABLE 1

| Active Material | Tainode TM-C |
|---|---|
| Compounding Ratio | 97.5 wt % |
| Binder | SBR 1.5 wt % |
|  | CMC 1.0 wt % |
| Current Collector | Cu foil (10 μm) |
| Coating Weight | 10.8 mg/cm$^2$ |
| Thickness | 66 μm |
| Density | 1.63 g/cm$^3$ |
| Electrical Conductivity | 6.4 × 10$^{-1}$ S/cm |
| Strength Test | Winding (4 mmΦ): OK |
|  | Powder Falling (3 Times): OK |
|  | Impregnation (Acetone): OK |
| Discharge Capacity | 361 mAh/g |

Figure 4:
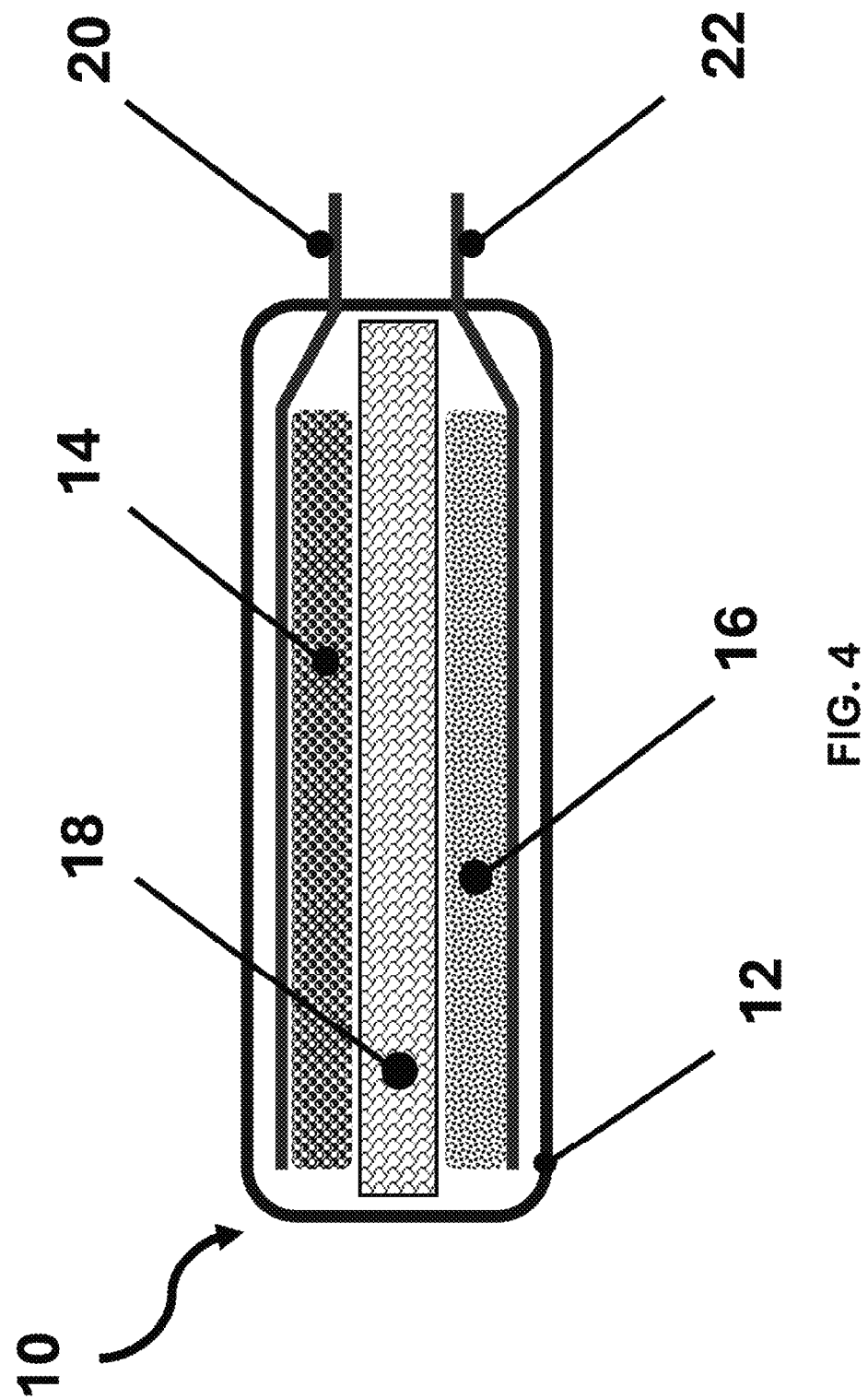
FIG. 4 is a cross-sectional view through a single layer laminate cell constructed in known manner, utilising the anode material of the present invention to provide an anode in accordance therewith.

Table 2 below and FIG. 4 show a full cell 10 incorporating the anode material and anode in accordance with the present invention. The full cell 10 comprises an aluminium laminate film or outer package 12, a negative electrode or anode 14 in accordance with the present invention, a positive electrode or cathode 16, and a separator 18, each arranged in substantially known manner. The anode 14 further comprises a copper current collector 20 and the cathode 16 further comprises an aluminium current collector 22. Importantly, there is no gas discharge during initial charge/discharge of the full cell 10, and minimal discharge at 3.6V charge (0.04cc).

TABLE 2

| Positive electrode | Composition | NMC/AB/PVdF = 93/4/3 |
|---|---|---|
|  | Thickness | 76 μm |
|  | Density | 2.8 g/cm$^3$ |
|  | Size | 30/50 mm |
| Negative electrode | Content | graphite/CMC/SBR = 97.5/1.0/1.5 |
|  | Thickness | 71 μm |
|  | Density | 1.5 g/cm$^3$ |
|  | Size | 32/52 mm |
| Separator |  | KRI standard PE microporous film |
| Electrolyte |  | 1M-LiPF$_6$/SEC7MEC + VC2< |
| Facing area |  | 15 cm$^2$ |

Figure 5:
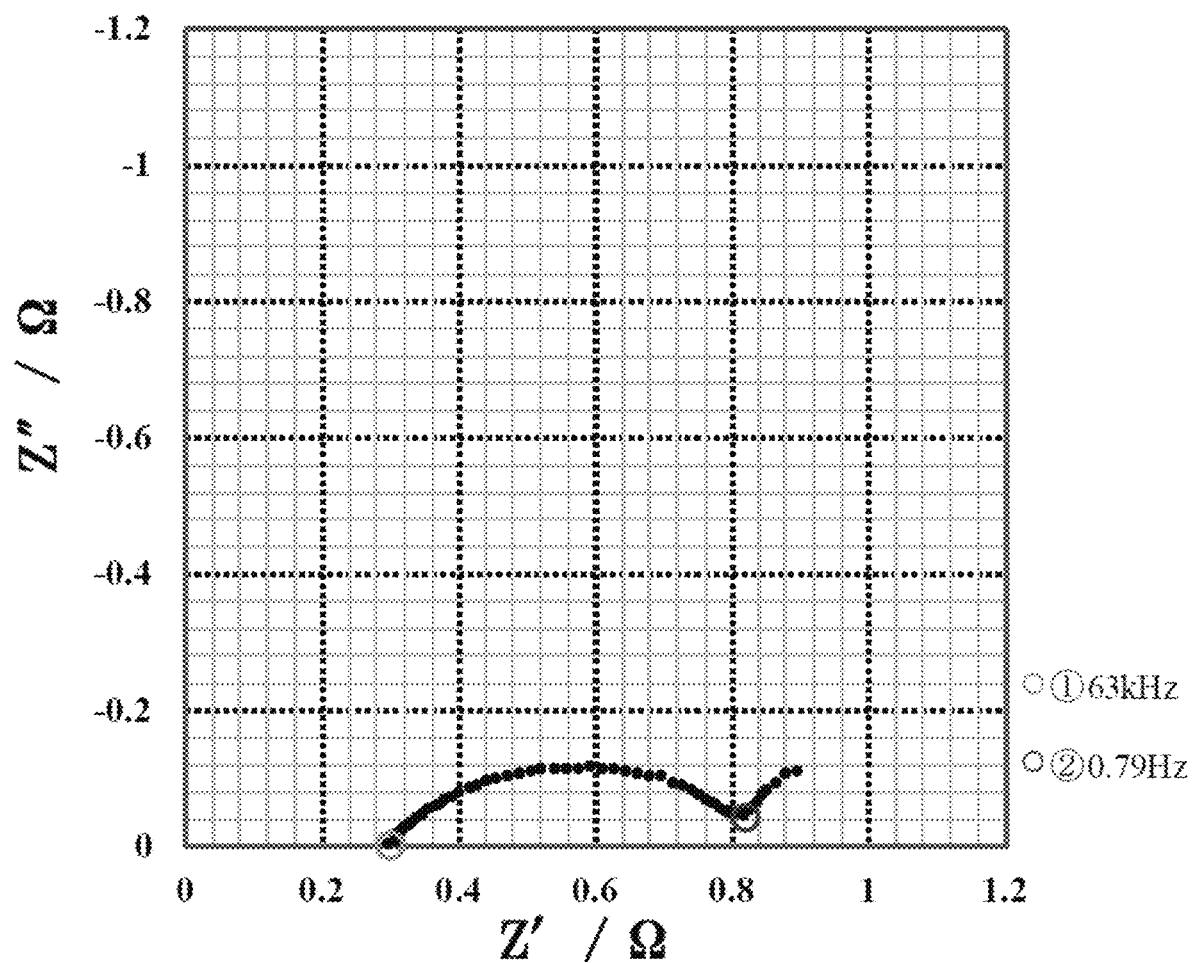
FIG. 5 is a Nyquist plot of resistance in a cell prepared utilising the anode material of the present invention to provide an anode in accordance therewith, at 25° C.
Figure 6:
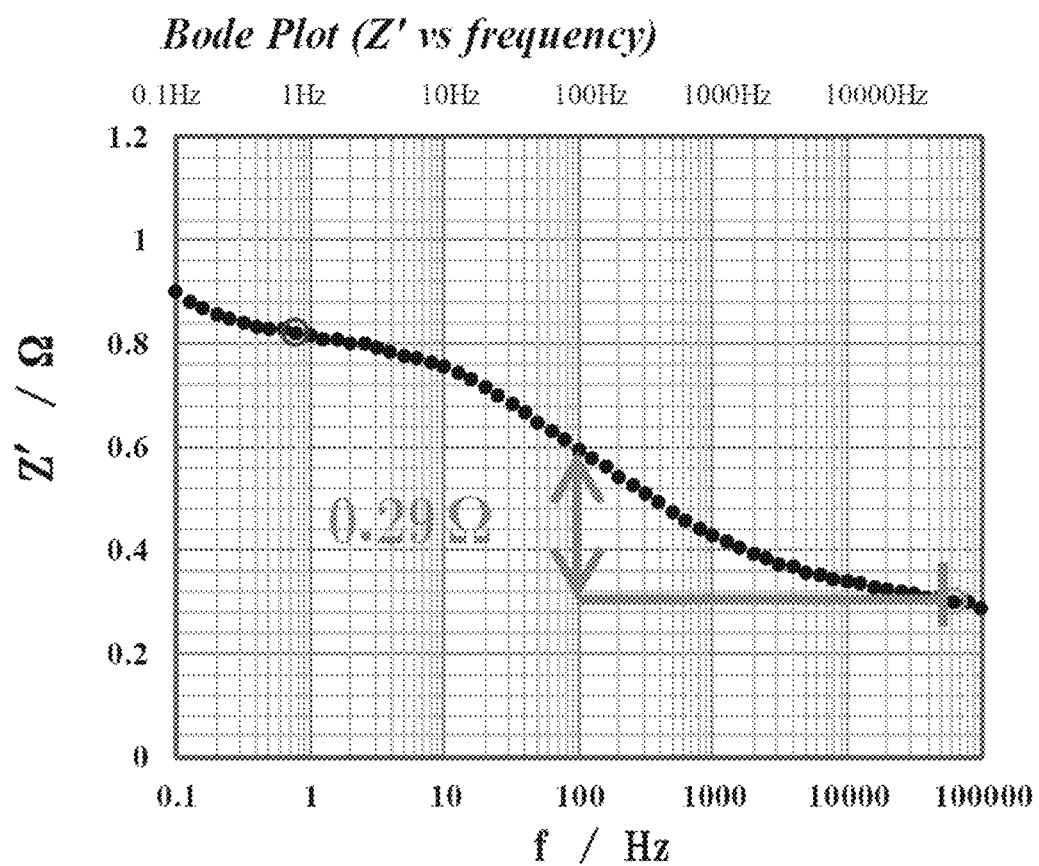
FIG. 6 is a Bode plot of resistance (Z' vs frequency) in a cell prepared utilising the anode material of the present invention to provide an anode in accordance therewith, at 25° C.
Figure 7:
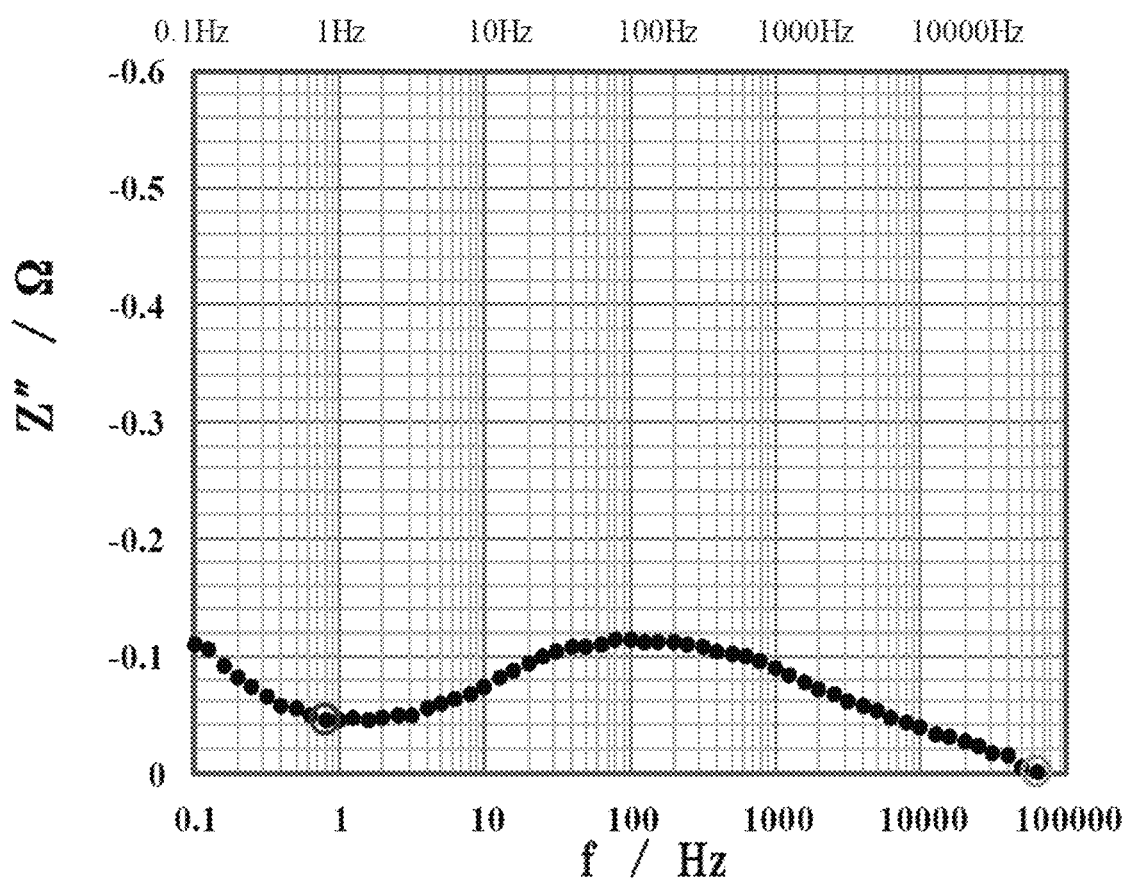
FIG. 7 is a Bode plot of resistance (Z" vs frequency) in a cell prepared utilising the anode material of the present invention to provide an anode in accordance therewith, at 25° C.
Figure 8:
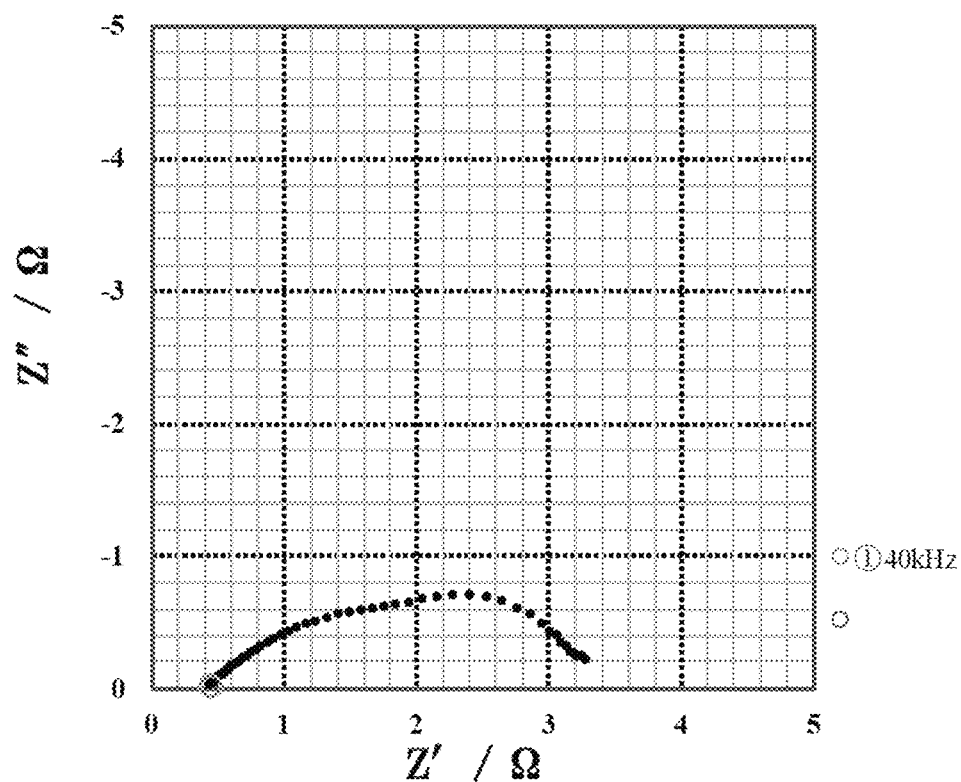
FIG. 8 is a Nyquist plot of resistance in a cell prepared utilising the anode material of the present invention to provide an anode in accordance therewith, at 0° C.
Figure 9:
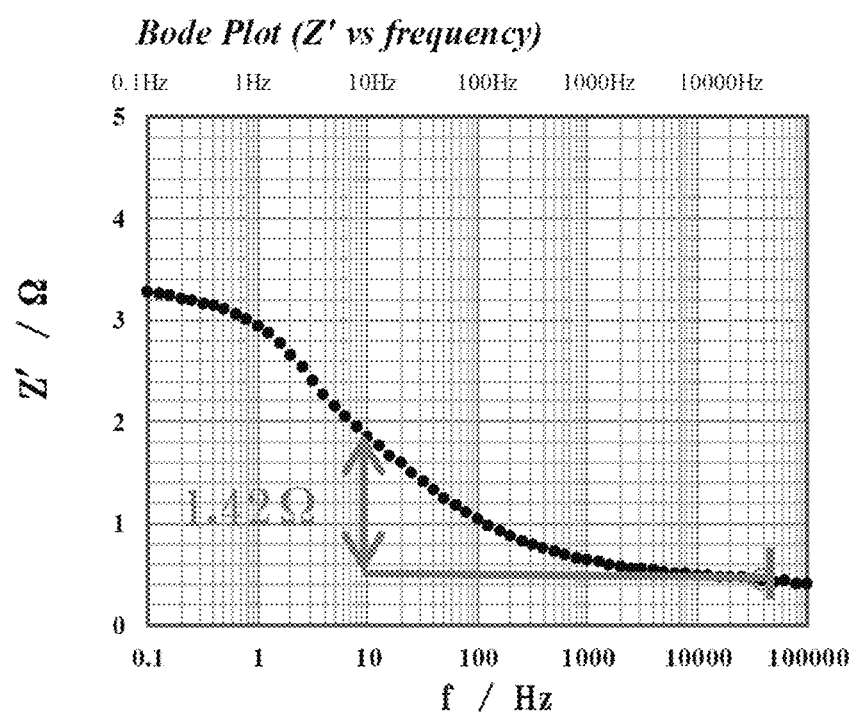
FIG. 9 is a Bode plot of resistance (Z' vs frequency) in a cell prepared utilising the anode material of the present invention to provide an anode in accordance therewith, at 0° C.
Figure 10:
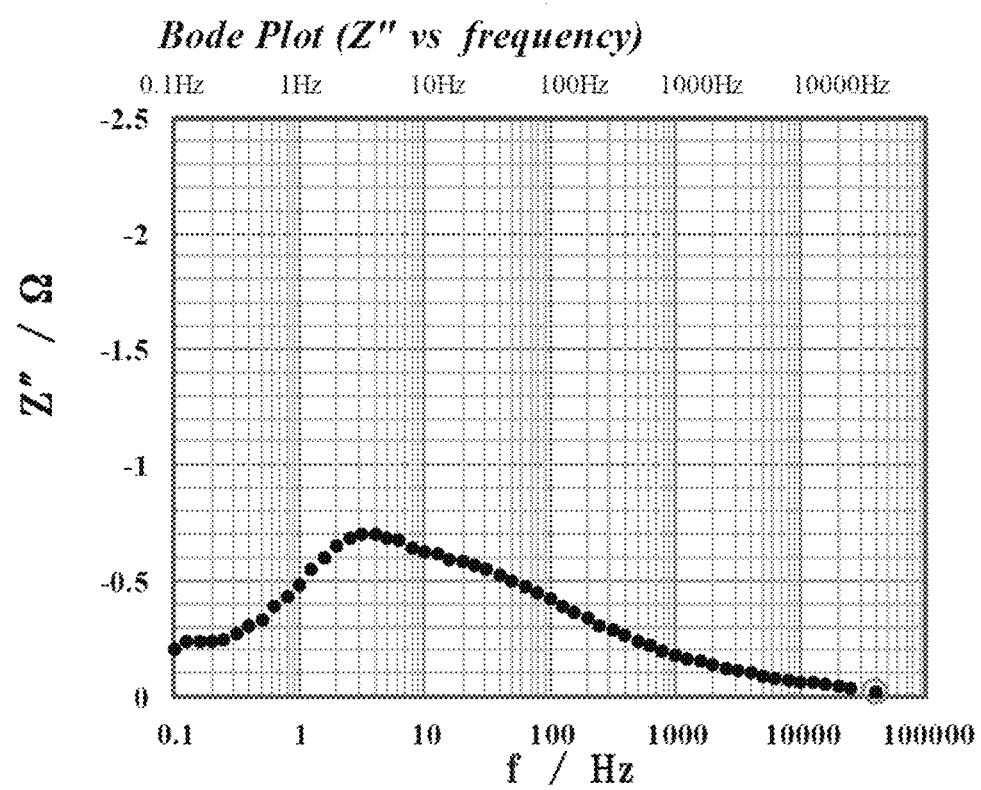
FIG. 10 is a Bode plot of resistance (Z" vs frequency) in a cell prepared utilising the anode material of the present invention to provide an anode in accordance therewith, at 0° C.

In FIGS. 5 to 7 there are shown plots of resistance in the cell 10 at 25° C., and which can be compared with FIGS. 8 to 10, in which there are shown plots of resistance in the cell 10 at 0° C. Importantly, the cell 10 demonstrates a 15% lower cell resistance relative to typical or known cells utilising current graphite anodes at 25° C. For example, the resistance value largely related to the reaction resistance of the negative electrode is 0.29, which is, as noted, about 15% lower than the cell resistance of typical or known cells utilising current graphite anodes at 25° C. At 0° C. the cell 10 is at the lowest level of typical or known cells utilising current graphite anodes.

Figure 11:
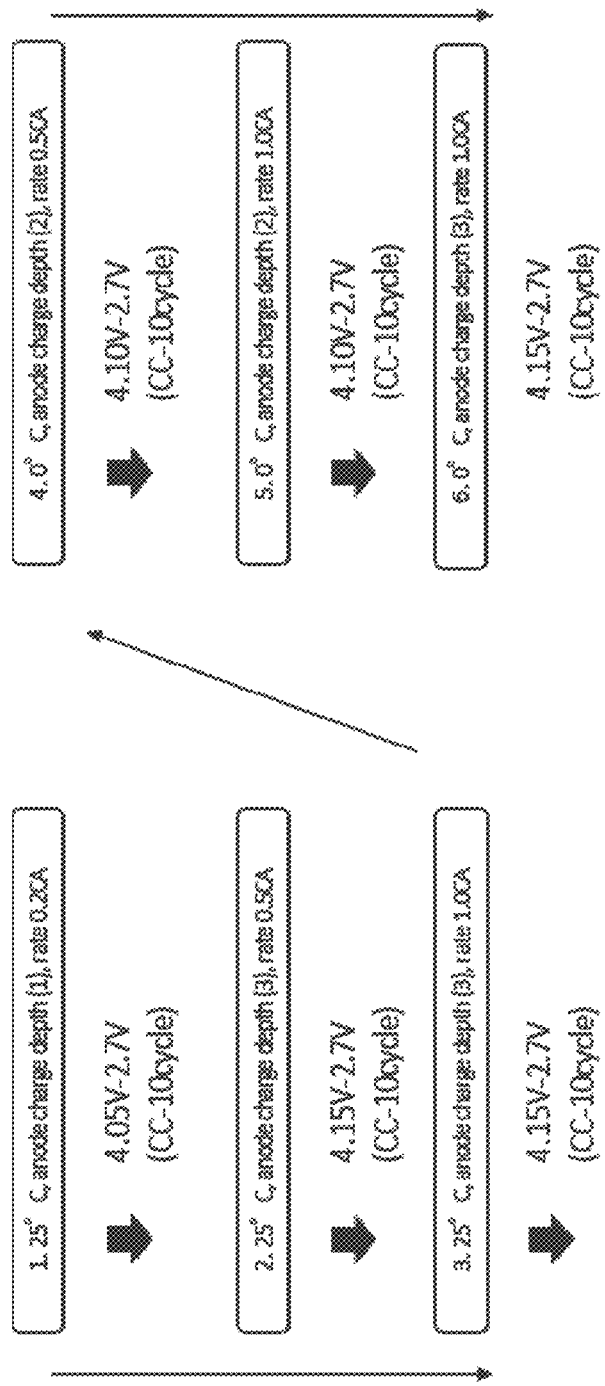
FIG. 11 is a diagrammatic representation of the limit load characteristics of a cell prepared utilising the anode material of the present invention to provide an anode in accordance therewith, showing the performance at 25° C. and 0° C., and utilising different C-rates.

A test protocol to test the limit load characteristics of the cell 10 (initial load and post-deterioration simulated load) at both 25° C. and at 0° C., 10 cycles per setting, and at variable charge depth, is represented in FIG. 11. Charge depth is varied by changing the charging voltage, and the cells are only partially charged/discharged to allow for different voltages. Resistance and charge depth detail is set out in Table 3 below. Performance evaluation of the cell 10 was conducted in this manner, considering different C-rates at the respective different temperatures. Details of the tests included the use of 10 cycles per setting, with the cell 10 being only partially charged/discharged so as to allow for different voltages.

TABLE 3

| IR revel/ Anode charge depth | (1)4.05 V | (2)4.10 V | (3)4.15 V |
|---|---|---|---|
| IR revel 25° C.-0.2 CA | ① |  |  |
| IR revel 25° C.-0.5 CA |  |  | ② |
| IR revel 25° C.-1.0 CA |  |  | ③ |
| IR revel 0° C.-0.5 CA |  | ④ |  |
| IR revel 0° C.-1.0 CA |  | ⑤ |  |
| IR revel 0° C.-1.0 CA |  |  | ⑥ |

Figure 12:
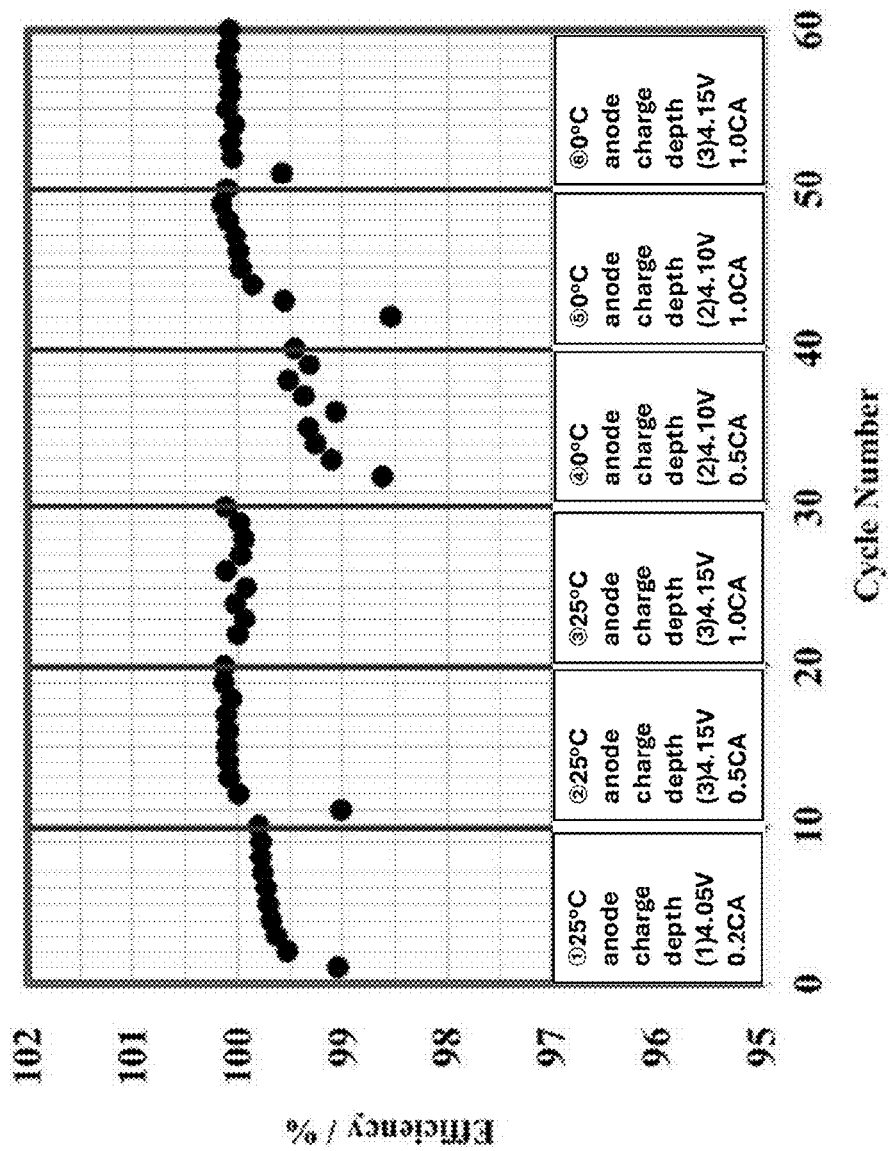
FIG. 12 is a graphical representation of the efficiency of an anode in accordance with the present invention at 25° C. and 0° C.

Further testing of the limit load characteristics of the cell 10 is represented in FIG. 12, in terms of efficiency. In Tables 4 and 5 below the related capacity data is provided.

TABLE 4

|  | ① | ② | ③ | ④ | ⑤ | ⑥ |
|---|---|---|---|---|---|---|
| Initial discharging capacity (mAh/g) | 273 | 281 | 254 | 191 | 116 | 132 |
| Final discharging capacity (mAh/g) | 260 | 250 | 283 | 187 | 119 | 132 |
| Capacity retention(%) | 98.4 | 99.5 | 99.6 | 98.1 | 102.9 | 100.4 |

TABLE 5

|  | ① | ② | ③ | ④ | ⑤ | ⑥ |
|---|---|---|---|---|---|---|
| Initial discharging capacity (mAh/g) | 273 | 281 | 254 | 191 | 116 | 132 |
| Final discharging capacity (mAh/g) | 269 | 280 | 253 | 187 | 119 | 132 |
| Capacity retention(%) | 98.4 | 99.5 | 99.6 | 98.1 | 102.9 | 100.4 |

At 25° C. the efficiency of the cell 10 is understood to be similar to that of leading known anode products. However, it is important to note that at 0° C. the leading known anode products have a capacity retention of less than 98%, which then rapidly decreases to a limit level. The anode material of the present invention rather has a cycling efficiency of 98% at low loading (4.1V) and achieves a cycling efficiency of 100% even as a result of high loading (4.15V) and after 60 cycles.

At 25° C. the cycle efficiency of the cell 10 is understood to be similar to that of leading known anode products. However, it is important to note that at 0° C. the leading known anode products have a capacity retention of less than 98%, which then rapidly decreases to a limit level. The anode material of the present invention rather has a cycle efficiency of 99% at low loading (4.1V) and achieves a capacity retention of 100% even as a result of high loading (4.15V) and after 60 cycles.

Figure 13:
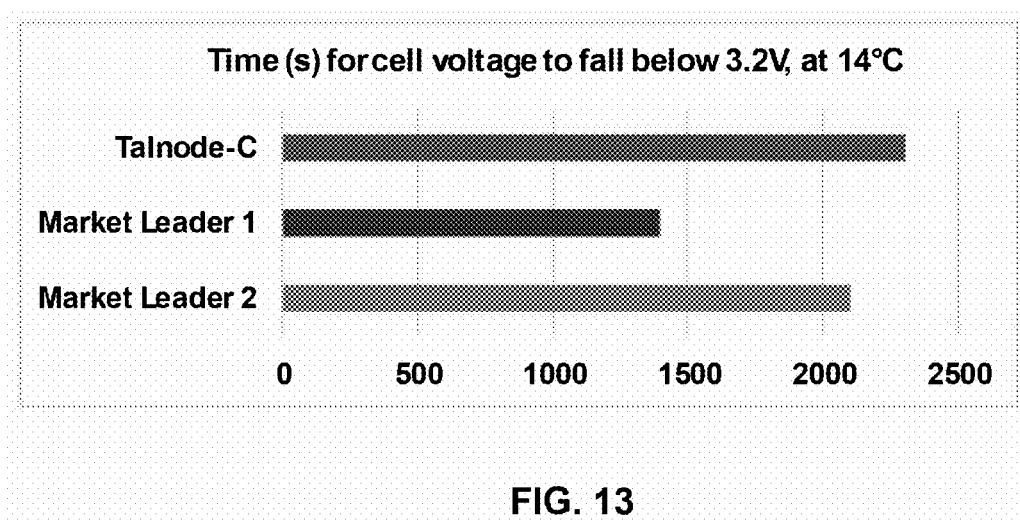
FIG. 13 is a graphical representation of voltage drop over time during endurance testing of a cell in accordance with the present invention at low temperature, comparing the performance against indicative 'market leaders'.
Figure 14:
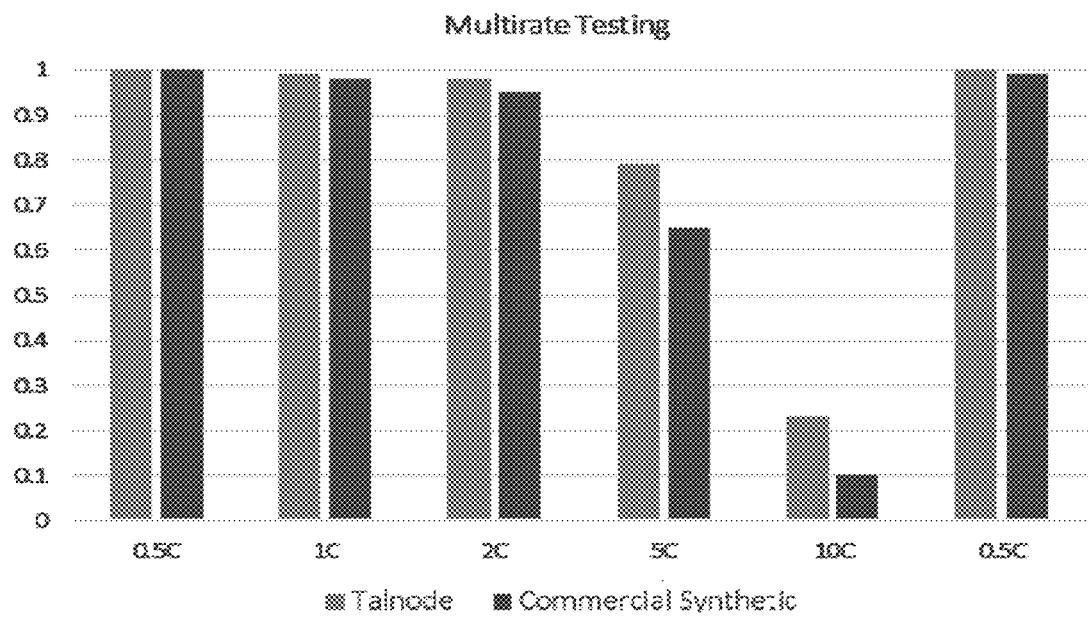
FIG. 14 is a graphical representation of capacity of a cell, at a different discharge rate, in accordance with the present invention at low temperature, comparing the performance against an indicative 'market leader'.

Testing has also been conducted to investigate the endurance of the cell 10 (here broadly referenced as either Talnode or Talnode-C) under conditions of high power and fast charge, relative to those of indicative 'market leader' products. The results of this testing are shown in FIGS. 13 and 14. A cyclic test was conducted and was designed to simulate driving a car up a mountain at high speed. This cyclic test measures the ability of the cell 10 to collect fast charge regenerative current (from braking) efficiently, after a high-power discharge (or acceleration) in low temperature conditions.

FIG. 13 describes the time for cell voltage to fall below 3.2 V at 14° C. The test cycle was discharge 3 seconds at 3C, charge 1 second at 1C, rest for 4 seconds, and repeat until voltage drop or thermal/cell temperature limits are reached.

FIG. 14 demonstrates that the cell 10 provides higher capacity than the indicative 'market leader', or 'commercial synthetic', at all C rates.

Figure 15:
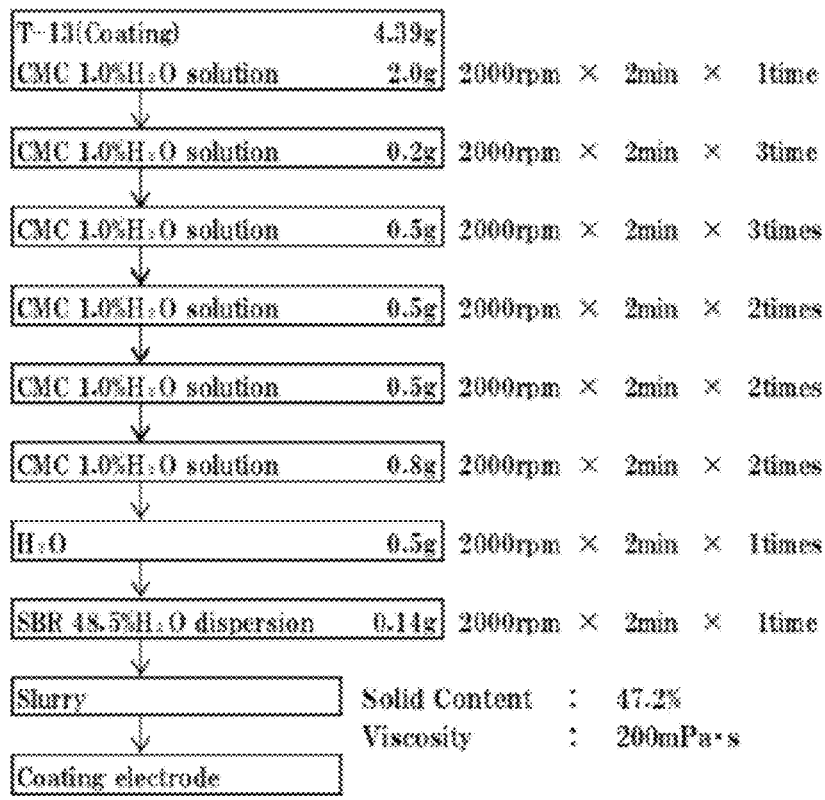
FIG. 15 is a is a schematic representation of the steps employed in the production of an electrode in accordance with another embodiment of the present invention, showing the secondary graphite particle (referenced here as 'T-13') being processed through a series of process steps to provide a slurry and in turn producing a coated electrode.

In FIG. 15 there is shown a representation of the method for slurrying an anode material in accordance with the present invention for application, in known manner, to a collector, to produce an anode in accordance with a further embodiment of the present invention. As noted, the secondary graphite particles of the present invention, here designated T-13, are mixed at an amount of 4.3 g, with 2 g of CMC, providing a 1.0% $H_2O$ solution. This is mixed at 2000 rpm for 2 minutes, once. Five subsequent additions of between 0.2 g to 0.8 g of CMC (1.0% $H_2O$ solution) are made and mixed at 2000 rpm for 2 minutes, either two or three times, as shown. A further single mixing in 0.5 g of $H_2O$ is conducted at 2000 rpm for 2 minutes is conducted. Further, a 0.14 g addition of SBR is provided (48.5% $H_2O$ dispersion), and mixed at 2000 rpm for two minutes, a single time. This process provides a slurry of anode material in accordance with the present invention at a solids content of 47.2% and a viscosity of 200 mPa·s. Subsequent application of the slurry so produced to a collector, and drying, is achieved in known manner. This process provides an anode composition of 97.5% wt/wt secondary graphite particles, about 1.5% wt/wt SBR and about 1% wt/wt CMC.

Table 6 below describes the characteristics of the anode produced in accordance with the present invention.

TABLE 6

| Active Material Compounding Ratio | T13(Coating) 97.5 wt % |
|---|---|
| Binder | SBR 1.5 wt % |
|  | CMC 1.0 wt % |
| Current Collector | Cu foil (10 μm) |
| Coating Weight | 9.4 mg/cm² |
| Thickness | 64 μm |
| Density | 1.47 g/cm³ |

TABLE 6-continued

| Active Material Compounding Ratio | T13(Coating) 97.5 wt % |
|---|---|
| Electrical Conductivity Strength test | 4.6 × 10⁻¹ S/cm Winding (4 mmΦ): ○ Impregnation (Acetone): ○ |

Figure 16:
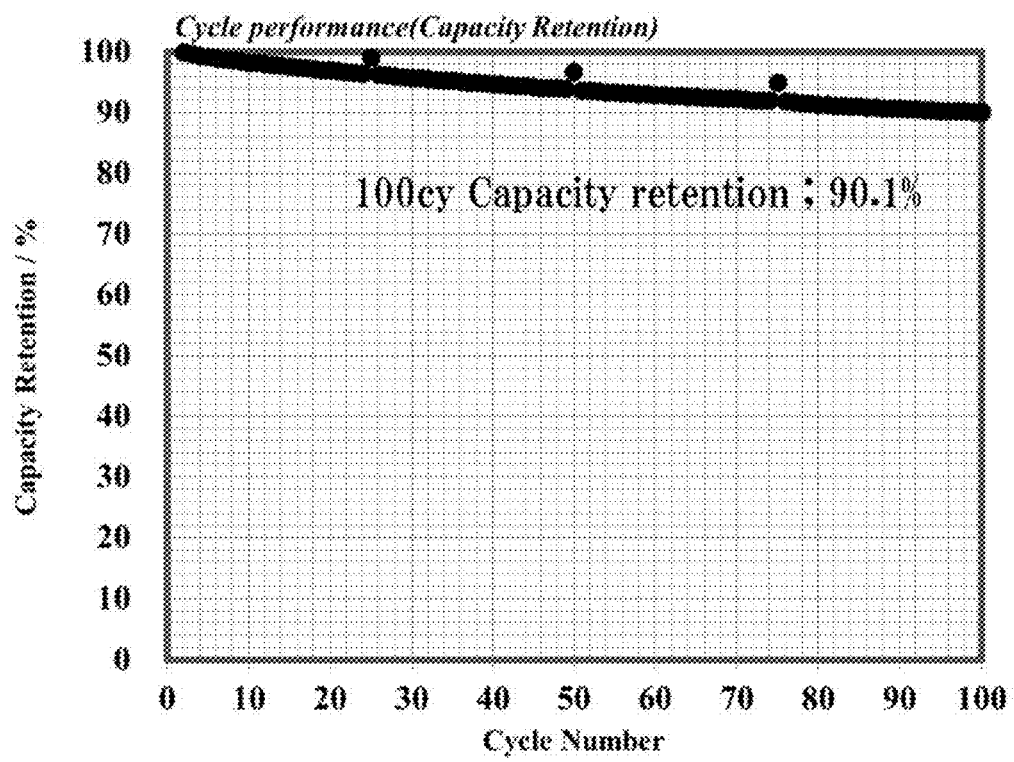
FIG. 16 is a graphical representation of cycle performance of a pouch cell in accordance with the present invention showing the capacity retention thereof.

FIG. 16 describes the cycle performance or capacity retention of 30×50 mm pouch cells (with NMC cathode) incorporating an anode composition in accordance with that of Table 6 across 100 cycles at 50° C., showing that capacity retention drops only to 90.1% over those 100 cycles. Cycles 1, 15, 50, 75 and 100 charge at 0.2C, 4.2V-CC; discharge at 0.20, 2.7V-CC. Cycles 2-24, 26-49, 51-74, 76-99 charge at 0.5C, 4.2V-CC; discharge at 0.5C, 2.7V-CC.

Figure 17:
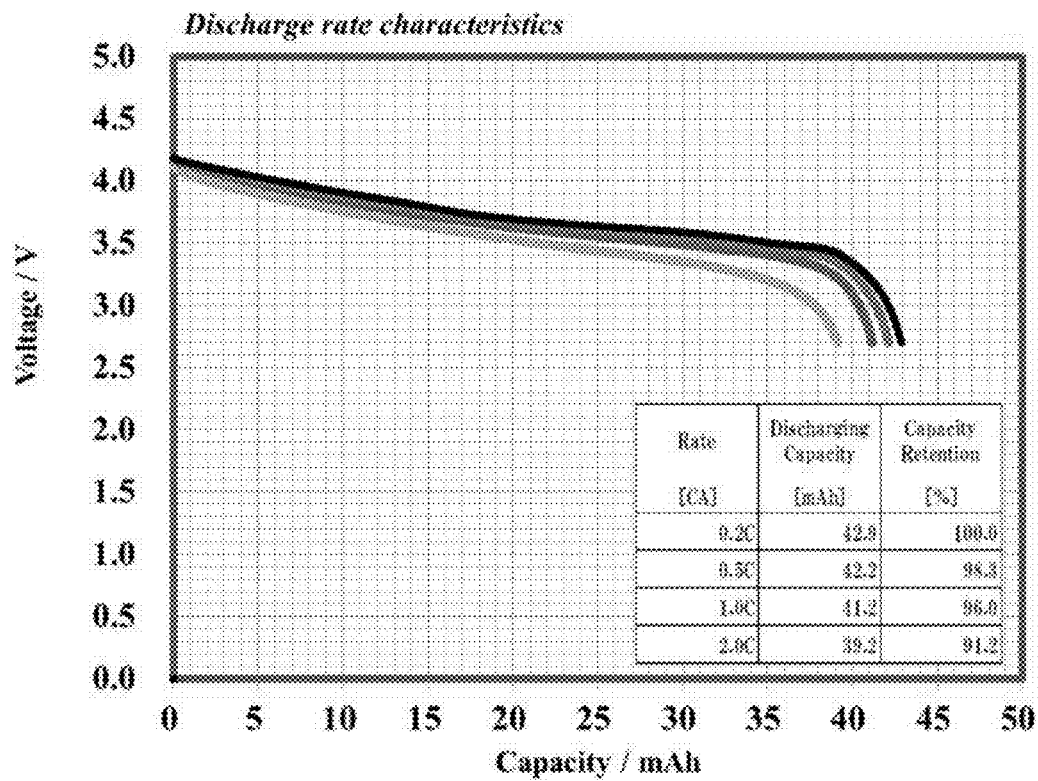
FIG. 17 is a graphical representation of discharge rate characteristics of a pouch cell in accordance with the present invention.

FIG. 17 demonstrates the discharge rates for the cells of FIG. 15 at 25° C. in terms of the relationship between capacity and voltage. A 91.2% capacity retention is achieved at 2C using an electrode loading capacity of 3.8 mAh/cm², assuming 100% capacity retention at 0.2C. Charge of 0.2C, 4.2V-CCCV with a current lower limit of 0.05C.

The anodes produced from the anode material of the present invention and the cells incorporating same demonstrate low electrode swelling relative to the expansion between lithiation and delithiation demonstrated by prior art natural and synthetic electrodes. This is despite the higher capacity of the anodes produced from the anode material of the present invention. For example, the anodes of the present invention have a capacity of greater than about 360 mAh/g, whilst synthetic anodes of the prior art typically have a capacity in the order of 340 to 350 mAh/g. Despite this, the anodes of the present invention demonstrate about 5% less anode swelling than those same synthetic anodes of the prior art, being in the order of 16% relative to the about 21% of the prior art.

Table 7 below provides a summary of the electrochemical properties and performance of the 30×50 mm single layer pouch cells (with NMC cathode) described above:

TABLE 7

| * Based on 30 × 50 mm single layer pouch cells | | | | |
|---|---|---|---|---|
| Electrochemical Properties | General | Electrode Density | | g/cm³ | 1.55 |
| | Half-cell | Mass loading (per side) | | mg/cm² | 9.4 |
| | | Temperature | | ° C. | 25 |
| | | Cut-off voltage | Upper | V | 2.5 |
| | | | Lower | V | 0.001 |
| | | Discharge capacity (C/5) | | mAh/g | 357 |
| | | Discharge capacity (1C) | | mAh/g | >340 |
| | | 1st cycle efficiency | | % | 91 |
| | Full-Cell | Used cathode material | | | NMC 111 |
| | | Separator | | | PE |
| | | Temperature | | ° C. | 25 |
| | | Cut-off voltage | Upper | V | 4.2 |
| | | | Lower | V | 2.7 |
| | | 1st cycle efficiency, T = 25° C. | | % | 84-88[1] |
| | | Capacity retention after 100 cycles C/2 discharge, T = 50° C. | | % | 89.6 |
| | | Fast charging capability, 0-80% SOC, T = 25° | | Mins | NT |
| | | Capacity at 2 C discharge (2.7 V-CC, 25° C., loading 3.8 mAh/cm²) | | % | 91.2 |
| | | Capacity retention at 0° C. | | % | 95.7 |

[1]The Applicant observed some variation on 1° Cycle Efficiency which depends on the NMC manufacturer and cell building (i.e. electrolytes, additive used, type of binder used, cell manufacturer).
[2]Capacity retention at 0° C. is based on limit-load characteristic test after 50 cycles.

1. The Applicant observed some variation on 1° cycle Efficiency which depends on the NMC manufacturer and cell building (i.e. electrolytes, additive used, type of binder used, cell manufacturer). 2. Capacity retention at 0° C. is based on limit-load characteristic test after 50 cycles.

As can be seen with reference to the above description, the electrochemical characterisation by impedance spectroscopy and galvanostatic charge-discharge cycling testing demonstrates that the anode material of the present invention, the anodes produced therefrom and the cells incorporating same, demonstrate fast charge and high power having intrinsically good charge transfer propriety, low electrical resistance and high diffusion of lithium into the secondary graphite particles. In turn, and amongst other things, this provides the promise of application in high power/fast charge batteries, with particular application at low temperatures. It is reasonably envisaged that the anode material of the present invention substantially overcomes problems of lithium plating formation at low temperatures and by this improves the safety of lithium-ion batteries. Further, the anode material of the present invention is understood to substantially overcome the problems of Cold Cranking Ampere (CCA) for lithium-ion battery systems, which should enable starter batteries utilising lithium-ion technology. Still further, the lower impedance of the anode material of the present invention produces cells having lower impedance, which in turn requires less 'thermal management' of lithium-ion cells at the 'battery pack' level. Yet still further, the improved low temperature performance of the anode material and cells of the present invention in turn improves the lifetime of such a cell on a single charge.

In addition, the anode material of the present invention, the anodes produced therefrom and the cells incorporating same, demonstrate relatively low electrode swelling, particularly in relative terms to anodes and cells of the prior art.

The above description further demonstrates that whilst improvements are realised in respect of the low temperature performance of the anode material of the present invention, this is achieved without significant impact on the performance at higher temperatures (for example 50° C.).

It is envisaged that the anode material of the present invention may comprise secondary graphite particles that predominantly have a form typified by being larger in two dimensions than/relative to their third dimension. It is to be understood that the oblate spheroid form satisfies such a criterion. It is further to be understood that the secondary graphite particles of the present invention may be, as described, comprised of an aggregate of primary graphite particles of indeterminate and/or variable form, whilst still presenting a generally oblate spheroid form.

Modifications and variations such as would be apparent to the skilled addressee are considered to fall within the scope of the present invention.

The invention claimed is:
1. An anode material comprising secondary graphite particles that have an oblate spheroid form and a $D_{50}$ of less than 5 microns, wherein the secondary graphite particles comprise an aggregate of ground primary graphite particles, and the ground primary graphite particles are spheronised and coated with a carbon based material being one or more of pitch, polyethylene oxide and polyvinyl oxide, then pyrolysed at a temperature between 880° C. to 1100° C. for a time in the range of 12 to 40 hours, thereby producing the secondary graphite particles, and wherein the amount of carbon based material in the secondary graphite particles is in the range of 2 to 10 wt % relative to graphite.

2. The anode material of claim 1, wherein the $D_{50}$ of the secondary graphite particles is:
   (i) between about 3 to 5 microns; or
   (ii) about 3.5 microns.

3. The anode material of claim 1, wherein the secondary graphite particles have a surface area (BET) of:
   (i) about 2 to 9 m²/g; or
   (ii) about 2 to 6 m²/g.

4. The anode material of claim 1, wherein a compression density of the secondary graphite particles at 75 kf/cm² is in the range of about 1.0 to 1.5 g/cc.

5. The anode material of claim 1, wherein a conductivity of the secondary graphite particles is in the range of:
   (i) about 25 to 37 S/cm; or
   (ii) about 31 S/cm.

6. The anode material of claim 1, wherein the anode material has a capacity retention of greater than 91% at 2C rate discharge.

7. The anode material of claim 1, wherein the ground primary graphite particles have a $D_{50}$ of:
   (i) less than about 15 microns;
   (ii) less than about 10 microns; or
   (iii) in the range of about 4 to 6 microns.

8. The anode material of claim 1, wherein the ground primary graphite particles have a surface area (BET) of:
   (i) about 2 to 9 m²/g; or
   (ii) 7 to 9 m²/g.

9. The anode material of claim 1, wherein the ground primary graphite particles have XRD characteristics of one or more of a d002 of >3.35 Å, an Lc of >1000 Å and an La of >1000 Å.

10. The anode material of claim 1, wherein the anode material further comprises:
    (i) a thickening agent; and/or
    (ii) an aqueous binder.

11. The anode material of claim 10, wherein the anode material comprises about 97.5% wt/wt of the secondary graphite particles, about 1.5% wt/wt of the aqueous binder and about 1% wt/wt of the thickening agent.

12. The anode material of claim 10 wherein the aqueous binder comprises styrene butadiene rubber (SBR).

13. The anode material of claim 10 wherein the thickening agent comprises carboxymethyl cellulose (CMC).

14. The anode material of claim 13 wherein the aqueous binder comprises styrene butadiene rubber (SBR).

15. A method for the production of an anode material, the method comprising grinding a graphite material to produce ground primary graphite particles, wherein those ground primary graphite particles are spheronised and coated with a carbon based material being one or more of pitch, polyethylene oxide and polyvinyl oxide, then pyrolysed at a temperature between 880° C. to 1100° C. for a time in the range of 12 to 40 hours, to produce secondary graphite particles that comprise an aggregate of ground primary graphite particles and that have an oblate spheroid form and a $D_{50}$ of less than 5 microns wherein the amount of carbon based material in the secondary graphite particles is in the range of 2 to 10 wt % relative to graphite.

16. The method of claim 15, wherein the ground primary graphite particles have a $D_{50}$ of:
    (i) less than about 15 microns;
    (ii) less than about 10 microns; or
    (iii) in the range of about 4 to 6 microns.

17. The method of claim 15, wherein the ground primary graphite particles have a surface area (BET) of:
  (i) about 2 to 9 m²/g; or
  (ii) 7 to 9 m²/g.

18. The method of claim 15, wherein the $D_{50}$ of the secondary graphite particles is:
  (i) between about 3 to 5 microns; or
  (ii) about 3.5 microns.

19. The method of claim 15, wherein the secondary graphite particles have a surface area (BET) of:
  (i) about 2 to 9 m²/g; or
  (ii) about 2 to 6 m²/g.

20. The method of claim 15, wherein the ground primary graphite particles have XRD characteristics of:
  (i) one or more of a d002 of >3.35 Å, an Lc of >1000 Å and an La of >1000 Å; or
  (ii) each of a d002 of >3.35 Å, an Lc of >1000 Å and an La of >1000 Å.

21. The method of claim 15, wherein the ground graphite particles are processed in an agglomeration and/or surface modification step producing the secondary graphite particles.

22. The method of claim 21, wherein the agglomeration and/or surface modification step comprises:
  (i) a spray drying process; or
  (ii) a spray drying process utilising a fluidised bed.

\* \* \* \* \*